United States Patent [19]
Ueno et al.

[11] Patent Number: 6,010,248
[45] Date of Patent: Jan. 4, 2000

[54] PRESSED RETAINER AND A BALL BEARING COMPRISING THE PRESSED RETAINER

[75] Inventors: Hiroshi Ueno, Tondabayashi; Kazuhisa Kajihara, Yao; Ikuo Ito, Kashiwara, all of Japan

[73] Assignee: Koyo Seiko Co., Ltd., Osaka, Japan

[21] Appl. No.: 09/027,911

[22] Filed: Feb. 23, 1998

[30] Foreign Application Priority Data

Feb. 28, 1997 [JP] Japan .................................. 9-045365

[51] Int. Cl.[7] ...................................................... F16C 33/56
[52] U.S. Cl. .......................... 384/527; 384/492; 384/528; 384/531; 384/913
[58] Field of Search ..................................... 384/527, 625, 384/913, 531, 528, 492

[56] References Cited

U.S. PATENT DOCUMENTS

| 1,494,012 | 5/1924 | Parsons . |
| 4,958,946 | 9/1990 | Voll . |
| 5,044,783 | 9/1991 | Willner . |

FOREIGN PATENT DOCUMENTS

| 1575676 | 1/1970 | Germany . |

OTHER PUBLICATIONS

Patent Abstracts of Japan, JP 06049623, vol. 018, No. 285, Feb. 22, 1994.

*Primary Examiner*—Lenard A. Footland
*Attorney, Agent, or Firm*—Thelen Reid & Priest

[57] ABSTRACT

The present invention is intended to provide a pressed retainer which can meet requirements for operation at high temperature and high speed, can sufficiently retain lubricant, does not allow ceramic balls, if used, to cut away track surfaces and is superior in wear resistance, and also intended to provide a ball bearing comprising the pressed retainer.

In order to solve problems, in the pressed retainer, wherein two ring-shaped retainer plates, having ball retaining portions and flat portions at predetermined intervals in the circumferential direction thereof, are combined to face with each other so as to form pockets for accommodating balls, a first spherical concave portion and a second spherical concave portion having a curvature radius smaller than that of the first spherical concave portion are formed at the ball retaining portions, and a nitrided layer is formed on the surfaces of the ring-shaped retainer plates. The ball bearing of the present invention uses the pressed retainer and ceramic balls.

4 Claims, 6 Drawing Sheets

PRESSED RETAINER AND A BALL BEARING COMPRISING THE PRESSED RETAINER

BACKGROUND OF THE INVENTION

The present invention relates to a pressed retainer and a ball bearing comprising the pressed retainer, more particularly to a pressed retainer and a ball bearing comprising the pressed retainer structured so as to be unlikely to seize even when used in areas where lubrication conditions are strict, such as the crankshaft of a two-cycle engine.

A pressed retainer for a conventional ball bearing is produced as described below. As shown in FIG. 6 for example, two ring-shaped retainer plates 52, 52 provided with ball retaining portions 53, 53, . . . disposed at equal intervals in the circumferential direction are faced to each other so that two mating ball holding portions, that is, one ball holding portion 53 and the other ball holding portion 53 form a pocket 56, and flat portions (joint portions) 54, 54 are joined and secured with rivets 7. A corrugated retainer 51 for this ball bearing, with balls disposed in the pockets 56, is disposed in a ring-shaped space between the inner and outer races (not shown) of the ball bearing.

FIG. 7A is a sectional plan view showing the pressed retainer 51 for the above-mentioned conventional ball bearing, taken in the circumferential direction of the pitch circle of the bearing. In this kind of ball bearing, when its race (inner race or outer race) rotates relatively, both the balls 5 and the retainer 51 rotate simultaneously (around the race). However, the ball 5 rotates around the race and also rotates on its axis while making contact with the forward surface in the rotation direction (advancing direction) and the inner wall surfaces of the pocket 56. In other words, when the pressed retainer 51 rotates around the race, the ball 5 makes contact with the inner wall surfaces 56a, 56b of the pocket 56 of the pressed retainer 51 in the advancing direction while rotating on its axis Z. The shapes of the contact areas of the inner wall surfaces 56a, 56b are shown in FIG. 7B as viewed from arrowed line A—A of FIG. 7A.

Recently, ball bearings comprising ceramic balls being usable in strict environmental conditions (temperature is high, high strength is required, lubrication is insufficient, and the like), have begun to be used. Such ceramic balls have begun to be used in some areas wherein the use of ordinary bearings is difficult, for example, in areas wherein heat resistance, strength, high speed resistance, insulation, etc. are required, because the ceramic balls are superior in light weight, heat resistance, high hardness, low coefficient of linear expansion, corrosion resistance, high hardness, etc.

In the conventional ball bearing comprising the retainer 51 shown in FIG. 6, when the ball 5 makes contact with the inner wall surfaces of the pocket 56 and rotates on its axis Z as shown in FIG. 8, and assuming that an angular speed during the rotation on its axis Z is ω, and a radius from a given surface of the ball 5 to the axis Z (vertical distance) is r, the circumferential speed v of the surface of the ball 5 is represented by ω·r. Therefore, the ball 5 makes contact with the inner wall surfaces of the pocket 56 of the pressed retainer 51 at positions where the rotation radius of the ball 5 becomes maximum, that is, areas of positions P, P where the circumferential rotation speed becomes maximum. Accordingly, the ball bearing comprising the conventional pressed retainer 51 is used in a condition wherein seizure is likely to occur, whereby the ball bearing causes the problem of relatively short service life.

In addition, if ceramic balls, having no lubrication capability in themselves and intended to be used in strict environmental conditions, are used in improperly lubricated areas, the balls having high hardness may cut away the track surfaces of the mating inner and outer races made of steel, or may significantly wear the retainer made by pressing. To solve these problems, an attempt has been made to use a super engineering plastic material having lubrication capability for the retainers of turbocharger bearings used at high temperature and high speed. However, since the material is a plastic material, it is subjected to limitations and restrictions with respect to heat resistance and wear resistance.

SUMMARY OF THE INVENTION

With a view to solving the above-mentioned problems, the present invention is intended to provide a pressed retainer which can meet requirements for operation at high temperature and high speed, can sufficiently retain lubricant, does not allow ceramic balls, if used, to cut away track surfaces and the like and is superior in wear resistance, and also intended to provide a ball bearing comprising the pressed retainer.

In other words, in order to solve the above-mentioned problems, (1) the present invention is intended to provide a pressed retainer, wherein two ring-shaped retainer plates, having ball retaining portions expanded outward and flat portions at predetermined intervals in the circumferential direction thereof, are combined so that each mating pair of the ball retaining portions are faced with each other so as to form pockets for accommodating balls, the pressed retainer being characterized in that each of the ball retaining portions formed on the ring-shaped retainer plates is formed by a first spherical concave portion having a curvature radius larger than that of a ball, that a second spherical concave portion having a curvature radius smaller than that of the first spherical concave portion is formed at the bottom of the first spherical concave portion, and that a nitrided layer is formed on the surfaces of the ring-shaped retainer plates, whereby the pressed retainer makes contact with each ball at boundaries between the first spherical concave portions and the second spherical concave portions.

In addition, (2) the pressed retainer is characterized in that the first spherical concave portion is formed of forward and backward spherical concave portions connected to the flat portions, that each curvature center of the forward and backward spherical concave portions is displaced slightly along the circumferential line passing through the center of the pocket for accommodating a ball from the center of the pocket to the side of the flat portion, and that the second spherical concave portion is formed at the bottom of the first spherical concave portion comprising the forward and backward spherical concave portions connected to the flat portions, whereby the pressed retainer makes contact with the ball at boundaries between the first spherical concave portions and the second spherical concave portions.

Alternatively, (3) the pressed retainer described in the means (1) or (2) is characterized in that the cross-sectional shape of the first spherical concave portion in the pitch circle direction is a semi-oval shape having its minor axis in the axial direction and its major axis in the circumferential direction.

Alternatively, (4) the pressed retainer described in the means (1), (2) or (3) is characterized in that the curvature center of the second spherical concave portion is displaced slightly to the bottom side of the first spherical concave portion along the axial line passing through the center of the pocket accommodating the ball.

Alternatively, (5) the ball bearing comprises an outer race, an inner race, ceramic balls and a pressed retainer described in one of the means (1) to (4).

DETAILED DESCRIPTION OF THE PREFERRED EMBODIMENTS

Preferred embodiments in accordance with the present invention will be described below referring to the accompanying drawings.

Figure 1:
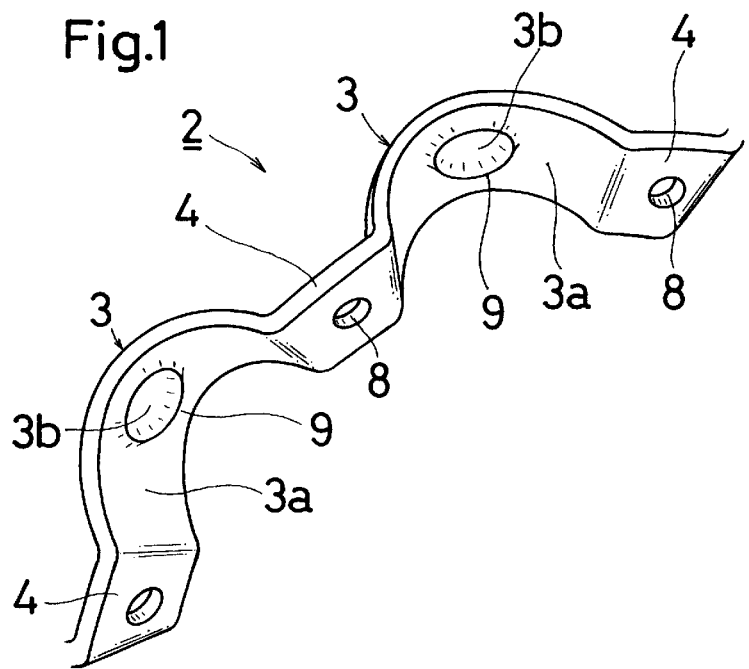
FIG. 1 is a perspective view showing one of two ring-shaped retainer plates constituting the pressed retainer of the present invention.
Figure 2:
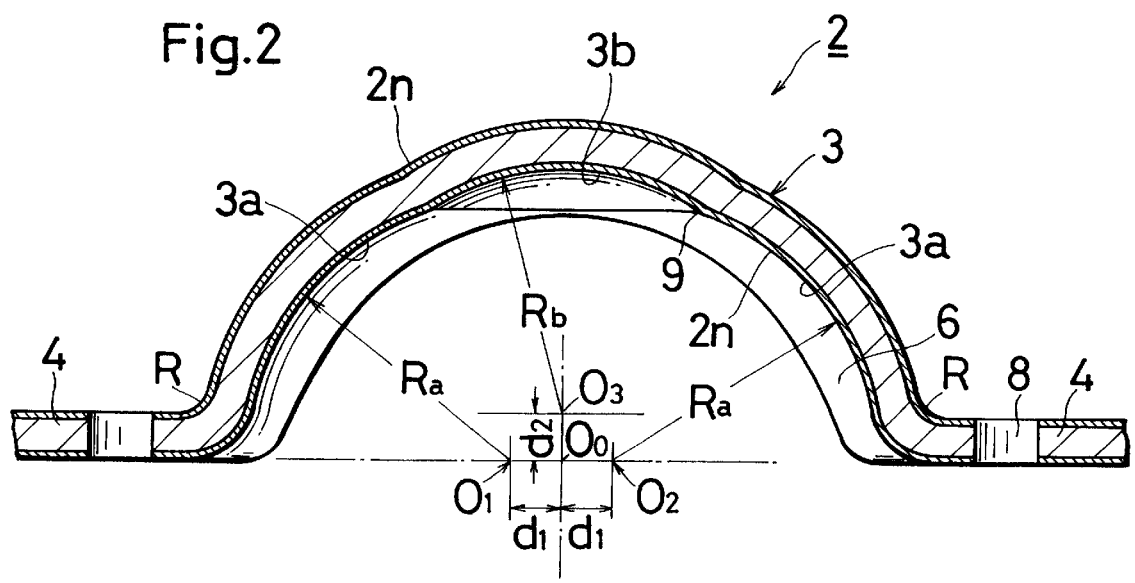
FIG. 2 is a sectional view taken along the circumferential central portion of the ring-shaped retainer plate constituting the pressed retainer of the present invention.
Figure 3:
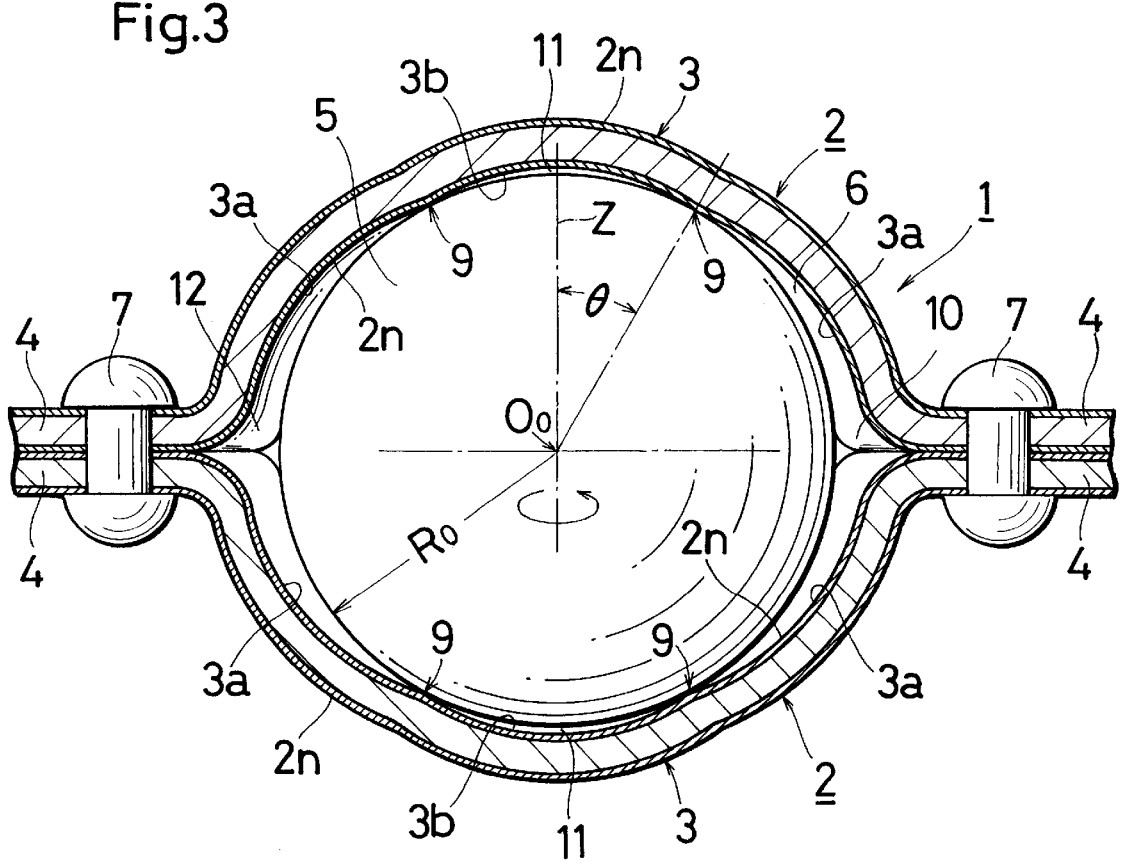
FIG. 3 is a sectional view taken along the circumferential central portion of the pressed retainer of the present invention, with a ball disposed in a pocket thereof.

FIG. 1 is a perspective view showing one of two ring-shaped retainer plates constituting the pressed retainer of the present invention, FIG. 2 is a sectional view taken along the circumferential central portion of the ring-shaped retainer plate, and FIG. 3 is a sectional view taken along the circumferential central portion of the pressed retainer of the present invention, with a ball disposed in a pocket thereof.

Ring-shaped retainer plates 2 constituting a pressed retainer 1 are made by pressing a strip of low carbon steel sheet, such as SPCC. Ball retaining portions 3, 3, . . . disposed circumferentially at constant intervals and expanded axially, and flat portions 4, 4, . . . are formed on each of the ring-shaped retainer plates 2. A first spherical concave portion 3a is formed at the ball retaining portion 3, and a small second spherical concave portion 3b is formed in the first spherical concave portion 3a. These ring-shaped retainer plates are joined to each other at each pair of the flat portions 4, 4 to form the retainer 1. The ball retaining portions 3, 3, . . . each provided with the first spherical concave portion 3a and the second spherical concave portions 3b, are used as pockets 6 for accommodating balls 5.

The first spherical concave portion 3a formed at the ball retaining portion 3 has two curvature centers. In other words, as shown in FIG. 2, one curvature center is provided at a position $O_1$ slightly displaced by $d_1$ circumferentially backward from the center $O_0$ of the pocket 6 (for convenience in explanation, one direction is taken as backward and the other direction is taken as forward), and the other curvature center is provided at a position $O_2$ slightly displaced by d1 circumferentially forward from the center $O_0$ of the pocket 6. In addition, the curvature radii $R_a$ of the two spherical concave portions constituting the first spherical concave portion 3a, centered at $O_1$ and $O_2$ disposed in front of and at the back of the center $O_0$ of the pocket 6, may be equal to,or slightly larger or smaller than the curvature radius $R_0$ of the ball 5. The area ranging from the first spherical convave portion 3a to the flat portion 4, formed on the ring-shaped retainer plate 2, is processed to have a smooth radius R.

Furthermore, the first spherical concave portion 3a is formed of the two spherical concave portions centered at $O_1$ and $O_2$, each having the curvature radius $R_a$ as described above. However, the first spherical concave portion 3a may be formed of only one spherical concave portion as necessary. In this case, its curvature center is displaced along the axis passing through the curvature center $O_0$ of the pocket 6, and the curvature radius $R_a$ is made larger than the curvature radius $R_0$ of the ball 5.

The curvature center of the second spherical concave portion 3b which is small and formed at the bottom of the first spherical concave portion 3a formed on the ring-shaped retainer plate 2 is located at a position $O_3$ displaced by $d_2$ to the bottom side of the first spherical concave portion 3a along the axis passing through the center $O_0$ of the pocket 6 for accommodating the ball 5. The curvature radius $R_b$ inside the spherical concave portion 3b is made slightly smaller than the curvature radius $R_0$ of the ball 5.

The shapes of the first spherical concave portion 3a and the second spherical concave portion 3b of one of the ring-shaped retainer plates 2 have been described above, and these shapes are completely the same as those of the first spherical concave portion 3a and the second spherical concave portion 3b of the other ring-shaped retainer plate 2 to be joined with the one ring-shaped retainer plate 2. The ring-shaped retainer plates 2 are nitrided after fluoridization as described later so as to form a nitrided layer 2n on their surfaces.

In order to form the pressed retainer 1, a pair of the ring-shaped retainer plates 2 having the above-mentioned configuration are faced with each other and joined so as to form the pockets 6 for accommodating the balls 5 at the ball retaining portions 3, 3, . . . In addition, rivets 7 are passed through holes 8, 8, . . . disposed in the joined flat portions 4, 4, . . . , and crushed to fasten the retainer plates 2. In this case, production can be carried out easily, since the first spherical concave portions 3a formed on the ring-shaped retainer plate 2, the second spherical concave portions 3b formed at the bottom inside the first spherical concave portions 3a, and the flat portions 4 are formed by pressing.

The ball 5 used for a ball bearing 21 (see FIG. 4) in accordance with the present invention is a ball made of a ceramic material. As this ceramic material, a nitride, such as Si3N4, AlN, BN or TiN, a carbide, such as SiC, B4C or WC, an oxynitride, such as Si4—zAlzOzN3—z, Si—M*—O—N (—M*: Be, Li, Mg, etc.), or an oxide, such as Al2O3 or Al2O3—ZrO3 is used. Powder of such a material is molded and sintered by the so-called HP or HIP method. However, explanations of concrete production methods are omitted.

Figure 4:
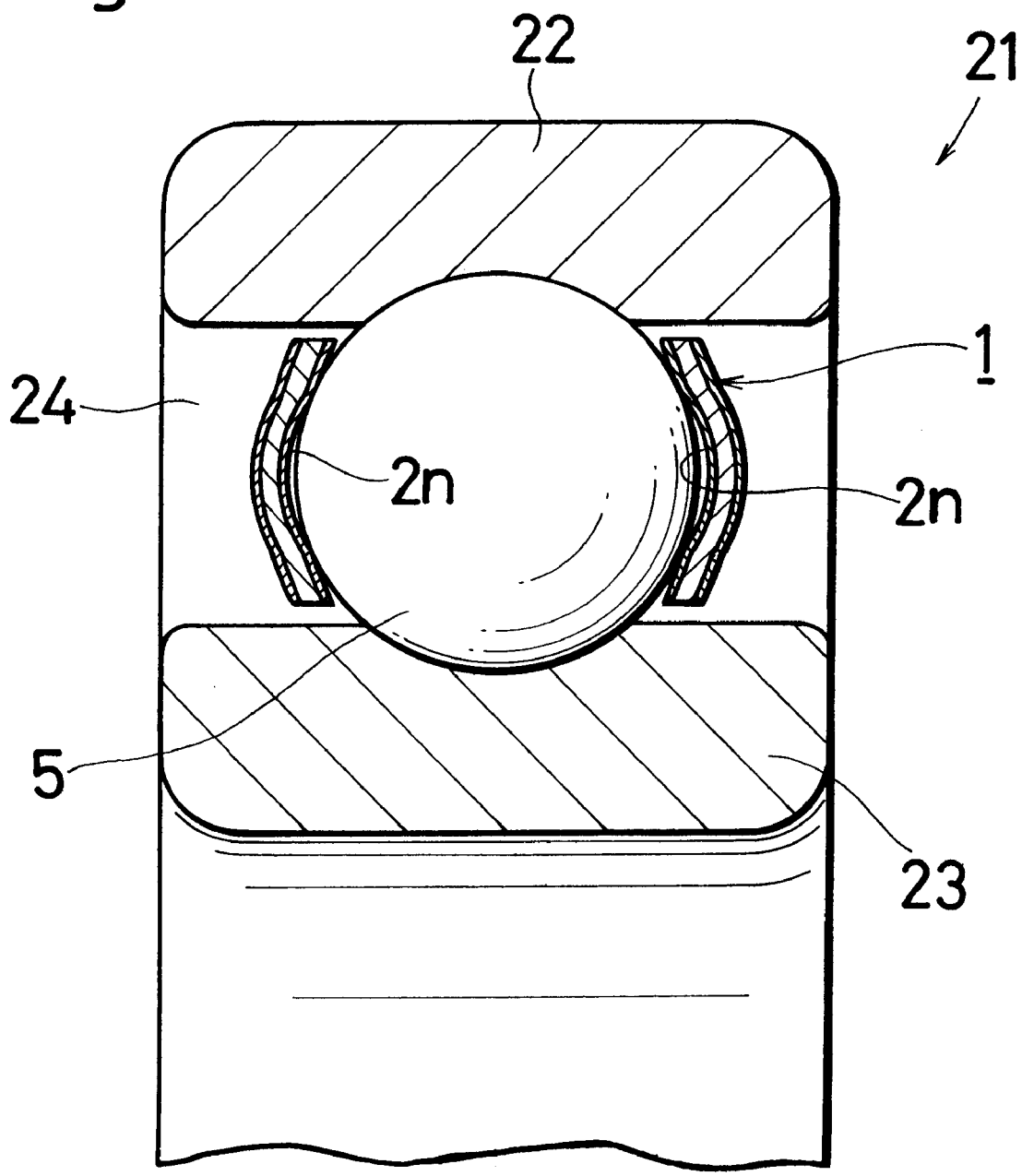
FIG. 4 is a partially sectional view showing the ball bearing comprising the pressed retainer of the present invention.

FIG. 4 is a partially sectional view showing the ball bearing 21 of the present invention, wherein the ceramic balls 5 are retained in the pressed retainer 1 comprising the above-mentioned ring-shaped retainer plates 2, and the retainer 1 is disposed in a ring-shaped space 24 between the outer race 22 and the inner race 23 of the ball bearing 21. Although the ring-shaped retainer plate 2 is nitrided, this nitriding is carried out after its base metal is fluoridized. On the surface of the ring-shaped retainer plate 2, a layer of nitride containing Fe3N as a main constituent, that is, a nitrided layer 2n, is laminated closely and uniformly. However, this nitrided layer 2n is only required to be formed on at least the inner circumferential surfaces of the pocket 6, that is, the spherical concave portions 3a, 3b.

Before the nitrided layer 2n is formed on the surface of the ring-shaped retainer plate 2, a fluoridization process is carried out to replace an oxide (an oxide of Cr, Mn, Si, Al, etc. in steel) on the surface of the ring-shaped retainer plate 2 with a fluoridized metal film as described below.

In other words, the ring-shaped retainer plate 2 to be processed is held in a mixed gas of a nitrogen trifluoride (NF3) gas and a nitrogen gas at a predetermined temperature (300 to 400 deg. C., for example) for a predetermined period (10 to 120 minutes). As a result, foreign matters, such as oxides, on the surface of the ring-shaped retainer plate 2 are destroyed and removed by activated fluorine atoms. When the surface is cleaned in this way, an oxide (a passive film such as an oxidized film) is replaced with a fluoridized metal film. Since this fluoridized metal film is a passive film, it prevents adsorption of oxygen to the surface and oxidation of the surface, whereby foreign matter, such as oxides, on the surface of the ring-shaped retainer plate 2 can be removed securely.

Furthermore, by nitriding, the nitrided layer 2n is formed on the ring-shaped retainer plate 2 on which the fluoridized metal film is formed. This nitriding treatment is carried out by gas nitriding. In other words, the ring-shaped retainer plate 2 having a fluoridized metal film on its surface is placed in a predetermined reaction gas, such as a gas containing NH3 only, or in a mixed gas containing NH3 and a carbon source (RX gas, for example) at a predetermined nitriding temperature (480 to 700 deg. C.) for a predetermined period (30 minutes to 5 hours).

While the temperature of the ring-shaped retainer plate 2 is raised from the fluoridization temperature (300 to 400 deg. C.) to the nitriding temperature (480 to 700 deg. C.), the fluoridized metal film on the surface of a workpiece to be treated (the ring-shaped retainer plate 2) becomes an active film. As a result, by nitriding, nitrogen deeply penetrates into the metal surface of the ring-shaped retainer plate 2. Cooling is then carried out for a predetermined period of time. The workpiece to be treated (the ring-shaped retainer plate 2) is held in nitrogen gas before the completion of the cooling, thereby preventing oxides from forming on its surface.

As described above, the ring-shaped retainer plate 2 constituting the pressed retainer 1 is fluoridized and then nitrided. Since the surface of the workpiece to be treated can be activated by fluoridization, the nitriding temperature (480 to 700 deg. C.) can be set lower than a temperature at which the workpiece to be treated is maintained when a nitrided film is formed by a conventional method. As the nitriding temperature becomes lower, the surface of the nitrided layer 2n is apt to be come smoother. In the particular case of the above-mentioned temperature (480 to 700 deg. C.), the surface of the nitrided layer 2n can be made smoother than the surface of the nitrided layer of a workpiece treated by conventional tufftriding. In addition, since the nitrided layer 2n is smooth, close-grained and almost free from cracks and the like, lubricant can be retained for a longer period on the nitrided surface 2n.

Figure 8:
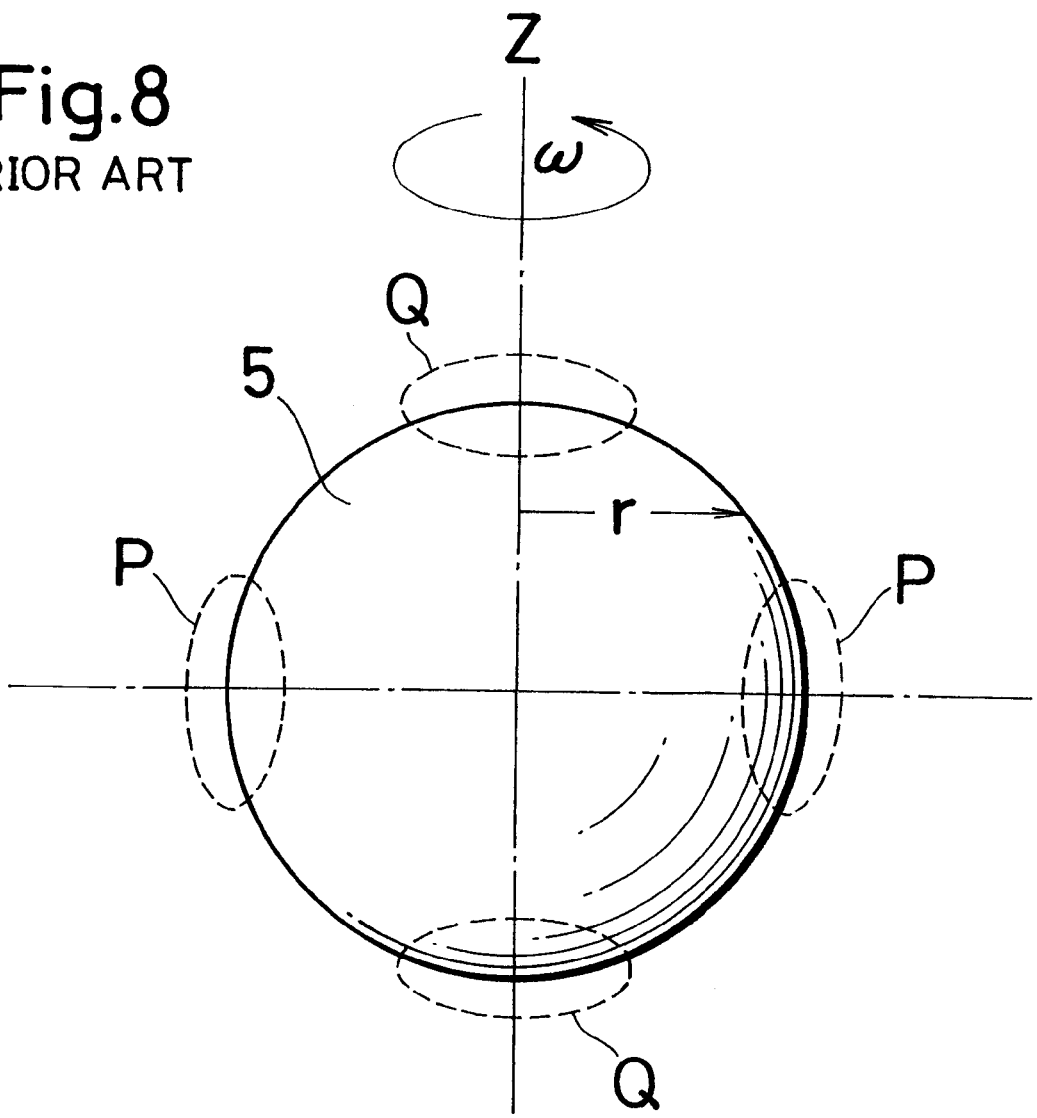
FIG. 8 is a view showing a ball rotating on its axis, which is disposed in a pocket of the pressed retainer of the conventional ball bearing.

As shown in FIG. 3, in the ring-shaped retainer plates 2 constituting the pressed retainer 1, the second spherical concave portion 3b is formed inside each of the first spherical concave portions 3a formed at equal intervals in the circumferential direction, and the nitrided layer 2n is also formed on the surface of the second spherical concave portion 3b by nitriding. The ceramic ball 5 accommodated in the pocket 6 of the corrugated retainer 1 is supported by contact at the boundaries 9, 9 between the first spherical concave portions 3a formed on the ring-shaped retainer plates 2 and the second spherical concave portions 3b formed at the bottom portions of t he first spherical concave portions 3a. When the ball 5 supported by contact at the boundaries 9 rotates, an angle θ between the boundaries 9 and the axis Z becomes fairly small. In other words, in case the ball 5 rotates on its axis when a race of the ball bearing comprising the pressed retainer 1 rotates, the ball 5 makes contact with the inner circumferential surface of the pocket 6 at positions Q, Q where the circumferential speed during the rotation on its axis is lowest, not at positions P, P where the circumferential speed during the rotation on its axis is highest (see FIG. 8). Therefore, the ball 5 makes contact with the inner circumferential surface of the pocket 6 at the positions where the speed during the rotation on its axis is low, whereby seizure is less likely to occur.

Furthermore, constant spaces 10, 12 are formed in the forward and backward areas of the pocket 6 in the pressed retainer 1 in its advancing direction during rotation, that is, between the ball 5 and the vicinities of the joint portions of the ring-shaped retainer plates 2, 2. These spaces 10, 12 function as "lubricant reservoirs." Moreover, spaces 11, 11 inside the small second spherical concave portions 3b formed inside the first spherical concave portions 3a formed on the ring-shaped retainer plates 2 also function as "lubricant reservoirs."

As described above, the pressed retainer 1 of the present invention comprises the two ring-shaped retainer plates 2 which have the ball retaining portions 3 provided with the spherical concave portions (3a, 3b) having two curvature radii and also have the nitrided layers 2n formed thereon. In addition, the surfaces of the retainer plates 2 are fluoridized to remove oxides and the like, and then nitrided to form the nitrided layers 2n, whereby the surfaces become higher in hardness. Furthermore, even when the ball 5 rotates on its axis while rotating around a race of the bearing, the ball makes contact wi th the ring-shaped retainer plates 2 of the retainer 1 at the boundaries 9 between the first spherical concave portions 3a and the second spherical concave portions 3b where the circumferential speed is low, whereby seizure is far less likely to occur. Moreover, a larger amount of lubricant can be retained in the lubricant reservoirs 10, 11, 12 formed in the spaces between the pocket 6 and the ball 5. Besides, although the surfaces of the ring-shaped retainer plates 2 constituting the retainer 1 are nitrided and hardened, their inner areas are soft. Therefore, the retainer plates 2 are superior in wear resistance and impact resistance.

Although the ceramic balls 5 are used for this ball bearing 21, since the retainer 1 itself is superior in wear resistance, the retainer 1 is not easily worn even when the ceramic balls 5 have high hardness. Additionally, although the ceramic balls 5 themselves have no lubricity, since a large amount of lubricant can be retained in the retainer 1, lubricant can be supplied to the track surfaces of the inner and outer races made of steel by the ceramic balls 5 having high hardness, whereby the track surfaces are not easily cut away. Therefore, with the retainer 1, the ceramic balls 5 can be used together with the inner and outer races made of ordinary steel at improperly lubricated areas.

As another embodiment of the pressed retainer 1 of the present invention, the first spherical concave portion 3a of the ball retaining portion 3 for forming the pocket 6 for accommodating the ball 5 may be a semi-oval spherical concave portion whose cross-sectional shape has its minor axis in the axial direction and its major axis in the circumferential direction, when the ring-shaped retainer plate 2 is cross-sectioned in the direction of its pitch circumference. In addition, the second spherical concave portion 3b having a curvature radius slightly smaller than the radius of the ball 5, and having its curvature center located at a position slightly displaced by $d_2$ to the axial direction from the center $O_0$ of the pocket for accommodating the ball 5 may be formed at the inside (the bottom) of the first spherical concave portion 3a. The second spherical concave portion 3b may be an oval spherical concave portion.

[EMBODIMENT]

Figure 5:
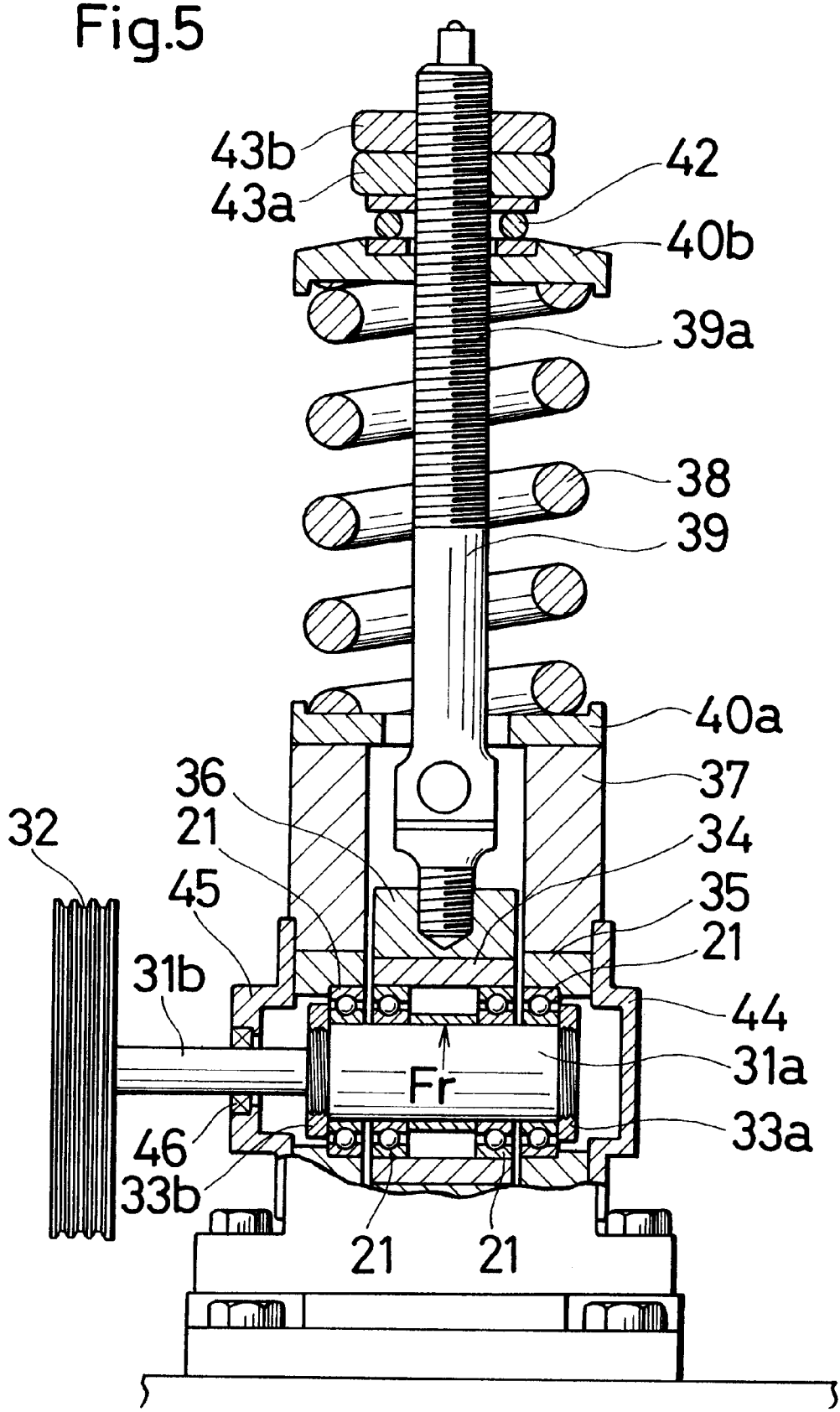
FIG. 5 is a sectional view showing a testing apparatus for performing rotation tests by using the ball bearing comprising the pressed retainer of the present invention.
Figure 6:
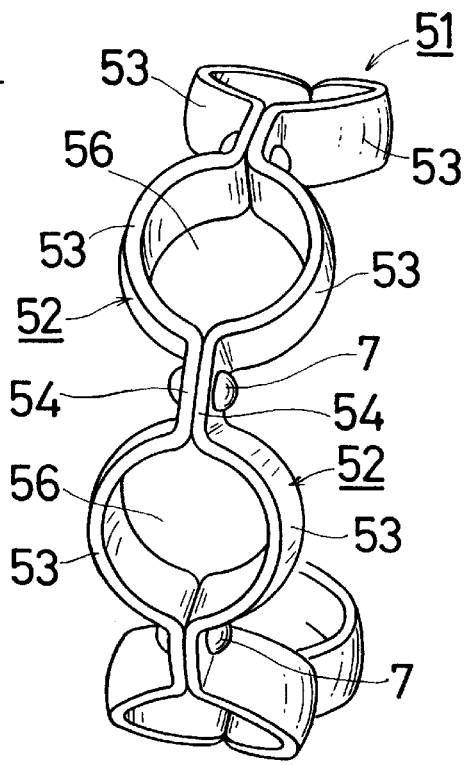
FIG. 6 is a perspective view showing the pressed retainer of a conventional bearing.
Figure 7A:
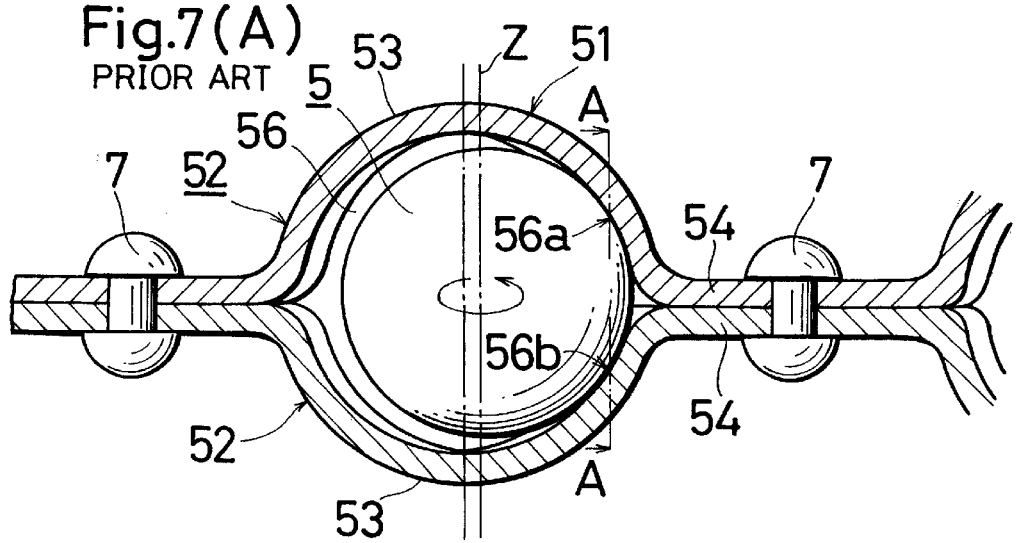
FIG. 7A is a plan view taken in the central circumferential direction of the pressed retainer of the conventional ball bearing.
Figure 7B:
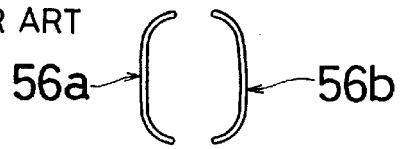
FIG. 7B is a view taken along arrowed line A—A of FIG. 7A, showing contact areas between the retainer and the ball.

FIG. 5 is a sectional view showing a testing apparatus for performing rotation tests by using the pressed retainer 1 of the present invention and the ball bearing 21 comprising the pressed retainer.

This testing apparatus comprises a shaft 31a provided with four ball bearings 21, 21, . . . (the number may be changed) to be tested, a shaft 31b integrated with the shaft 31a and provided with a rotation pulley 32 at its end, securing nuts 33a, 33b for securing the ball bearings 21, 21, . . . on both sides thereof, a housing 34 in which the outer races of the two inside bearings 21, 21 of the four bearings are fitted, a housing 35 in which the outer races of the two outside bearings 21, 21 are fitted, a support frame 36 in which the inside housing 34 is fitted, a support frame 37 in which the outside housing 35 is fitted in, a load application shaft 39 threaded into the support frame 36 and provided with a male thread 39a, a spring holder 40a provided on the support frame 37, a load application spring 38 provided on the spring holder 40a, a spring holder 40b provided on the load application spring 38, a bearing 42 provided on the spring holder 40b, a load application nut 43a engaged with the male thread 39a of the load application shaft 39 via the bearing 42, and a securing nut 43b. Furthermore, on the outside of the support frame 37, covers 44, 45 for hermetically protecting the ball bearings 21, 21, . . . mounted (fitted) on the shaft 31a. A bearing 46 is fitted in the cover 45 to support the shaft 31b extended therethrough.

For a load test, a predetermined load is applied to the ball bearings 21, 21, . . . as described below. That is, when the load application nut 43a is turned, the load application spring 38 provided for the support frame 37 is compressed. The reaction force Fr of the load application spring 38 acts to lift the load application shaft 39, and also acts to lift the housing 34 integrated with the load application shaft 39. As a result, the same load Fr is applied to the four ball bearings 21, 21, . . . via the shaft 31a.

The ball bearings 21 of the present invention were compared with ordinary (conventional) ball bearings by testing them using the above-mentioned testing apparatus. In this case, four conventional ball bearings were tested simultaneously (during rotation at the same load). If one of the bearings caused seizure, the test was stopped. The test was conducted four times. Therefore, totally 16 conventional ball bearings were used.

In addition, four ball bearings 21 of the present invention were tested simultaneously (during rotation at the same load) three times. Therefore, totally 12 ball bearings of the present invention were used.

The test results are indicated in TABLE 1.

TABLE 1

| Load condition | Classification | First time | Second time | Third time | Forth time |
|---|---|---|---|---|---|
| Shaft rotation speed: 8800 RPM Load: 1470N (150 kgf) No. 6305 | Conventional ball bearing | Seizure after 26 second | Seizure after 31 second | Seizure after 33 second | Seizure after 47 second |
| | Ball bearing of the present inventio | No seizure even after 120 minutes | No seizure even after 120 minutes | No seizure even after 120 minutes | No seizure even after 120 minutes |

As detailed above, by using the pressed retainer of the present invention and the ball bearing comprising the pressed retainer, corrugated retainers and ball bearings can be made superior in heat resistance and wear resistance. In particular, since the ball bearing comprising the pressed retainer can be made superior in lubrication performance and wear resistance, the ball bearing can have a long service life. In addition, the pressed retainer is nitrided to greatly enhance wear resistance and lubricant retaining capability. Therefore, the pressed retainer can fully utilize the superior advantages of ceramic balls, such as light weight, heat resistance, high strength, low coefficient of linear expansion, corrosion resistance, high hardness, etc. Consequently, the ball bearing comprising the pressed retainer can fully deliver its capability at strict environmental areas where heat resistance, high strength, high speed performance, insulation, etc. are required. The ball bearing can thus be used as a long-life ball bearing which is unlikely to seize even in areas where lubrication conditions are improper, such as an area in the crankshaft of a two-cycle engine for example.

What is claimed is:

1. A retainer for a ball bearing comprising two ring-shaped retainer plates, each retainer plate having a ball retaining portion and flat connecting portions, said ball retaining portions of the two retainer plates facing each other in mirror relation to form a pocket for receiving a ball bearing characterized in that each of said ball retaining portions is formed of a first spherical concave portion and second spherical concave portion, said first and second spherical concave portions being concentric about a single axis and being connected to each other at a circular linear contact boundary and dimensioned so that a ball bearing in said pocket makes contact with said retainer lates only at said second spherical concave portion of each ball retaining portion and wherein a nitride layer is provided on surfaces of said ring-shaped retainer plates.

2. A retainer in accordance with claim 1 wherein said first spherical concave portion has two centers of curvature, each being spaced an equal distance from said axis and each being diametrically opposed to the other on opposite sides of said axis.

3. A retainer in accordance with claim 1 characterized in that the curvature radius of said first spherical concave portion is larger than the radius of said ball bearing.

4. A retainer in accordance with claim 3 characterized in that the curvature radius of said second spherical concave portion is smaller than the curvature radius of said first spherical concave portion.

* * * * *